US011142042B2

(12) United States Patent
Russ

(10) Patent No.: US 11,142,042 B2
(45) Date of Patent: Oct. 12, 2021

(54) FAN AND CANOPY ASSEMBLY FOR RIDING VEHICLE

(71) Applicant: William Russ, Belhaven, NC (US)

(72) Inventor: William Russ, Belhaven, NC (US)

( * ) Notice: Subject to any disclaimer, the term of this patent is extended or adjusted under 35 U.S.C. 154(b) by 94 days.

(21) Appl. No.: 16/588,281

(22) Filed: Sep. 30, 2019

(65) Prior Publication Data

US 2020/0023714 A1   Jan. 23, 2020

Related U.S. Application Data

(63) Continuation of application No. 15/811,782, filed on Nov. 14, 2017, now Pat. No. 10,464,394, which is a continuation of application No. 14/225,890, filed on Mar. 26, 2014, now Pat. No. 9,844,998, which is a continuation of application No. 13/768,580, filed on Feb. 15, 2013, now Pat. No. 8,720,971, which is a continuation of application No. 13/585,307, filed on Aug. 14, 2012, now Pat. No. 8,398,145, which is a continuation of application No. 12/548,402, filed on Aug. 26, 2009, now Pat. No. 8,262,149.

(60) Provisional application No. 61/091,812, filed on Aug. 26, 2008.

(51) Int. Cl.
*B60J 7/00* (2006.01)
*B60H 1/24* (2006.01)
*B60H 1/00* (2006.01)
*B62D 25/06* (2006.01)
*B62D 33/06* (2006.01)

(52) U.S. Cl.
CPC ......... *B60H 1/245* (2013.01); *B60H 1/00407* (2013.01); *B62D 25/06* (2013.01); *B62D 33/0625* (2013.01)

(58) Field of Classification Search
CPC . F04D 25/088; F04D 29/601; B60H 1/00407; B60H 1/245; B62D 25/06; B62D 33/0625
See application file for complete search history.

(56) References Cited

U.S. PATENT DOCUMENTS

| | | | | |
|---|---|---|---|---|
| 2,817,281 A | * | 12/1957 | Schwan | B60J 7/08 454/189 |
| 3,489,374 A | * | 1/1970 | Morcom | B64C 39/06 244/12.2 |
| 3,939,802 A | * | 2/1976 | Neff | A01K 61/80 119/51.04 |
| 4,112,957 A | | 9/1978 | Biven | |
| 4,297,057 A | * | 10/1981 | O'Neil | E21D 19/02 175/219 |
| 4,710,778 A | * | 12/1987 | Radov | H01Q 1/42 343/720 |
| 5,042,456 A | | 8/1991 | Cote | |
| 5,044,298 A | * | 9/1991 | Pepper | B63B 17/02 114/361 |
| 5,172,711 A | * | 12/1992 | Mueller | A45B 3/00 135/16 |
| 5,277,655 A | * | 1/1994 | Storkan | B60H 1/00378 454/143 |

(Continued)

*Primary Examiner* — Kiran B Patel

(74) *Attorney, Agent, or Firm* — Maier & Maier, PLLC

(57) ABSTRACT

A riding vehicle is provided with a downdraft fan assembly mounted on a vehicle roll bar for providing a flow of ambient air over the vehicle operator and a canopy carried by the fan assembly and providing solar and precipitation protection for the operator.

10 Claims, 7 Drawing Sheets

(56) References Cited

U.S. PATENT DOCUMENTS

| | | | | |
|---|---|---|---|---|
| 5,299,337 | A | * | 4/1994 | Venza ................. A47C 16/005 |
| | | | | 5/656 |
| 5,579,797 | A | | 12/1996 | Rogers |
| 5,711,095 | A | * | 1/1998 | Oda ..................... E02F 3/325 |
| | | | | 180/327 |
| 5,806,622 | A | * | 9/1998 | Murphy ................ B60K 26/02 |
| | | | | 180/210 |
| 5,845,886 | A | * | 12/1998 | McCormick ......... F04D 25/088 |
| | | | | 248/200.1 |
| 6,027,137 | A | * | 2/2000 | Rura ..................... A47D 15/00 |
| | | | | 280/650 |
| 6,202,394 | B1 | * | 3/2001 | Russ ..................... A01D 34/001 |
| | | | | 180/84 |
| 6,213,935 | B1 | * | 4/2001 | Mackin ................. A61G 11/00 |
| | | | | 600/22 |
| 6,317,910 | B1 | * | 11/2001 | Wilson .................. A47C 29/003 |
| | | | | 135/90 |
| 6,409,206 | B1 | * | 6/2002 | Willrich ................ B62B 9/00 |
| | | | | 261/DIG. 3 |
| 6,431,924 | B1 | | 8/2002 | Dolhay |
| 6,443,591 | B1 | * | 9/2002 | Swensson ............ A61G 13/108 |
| | | | | 362/130 |
| 6,637,759 | B2 | | 10/2003 | Jones |
| 6,729,830 | B2 | * | 5/2004 | Wagner ................. E02F 3/283 |
| | | | | 414/686 |
| 6,896,088 | B2 | | 5/2005 | Dahl et al. |
| 6,935,944 | B2 | | 8/2005 | Bigelow, Jr. |
| 7,150,162 | B1 | | 12/2006 | Brunner |
| 7,188,865 | B2 | * | 3/2007 | Sugiyama ............ E02F 9/0833 |
| | | | | 280/759 |
| 7,320,380 | B2 | * | 1/2008 | Ueda .................... E02F 9/0808 |
| | | | | 180/327 |
| 7,431,377 | B2 | * | 10/2008 | Tyrer .................... B60J 7/1278 |
| | | | | 296/100.14 |
| 7,481,289 | B2 | | 1/2009 | Ueda et al. |
| 7,566,095 | B2 | * | 7/2009 | Reeb ..................... A47C 7/66 |
| | | | | 297/184.15 |
| 7,581,539 | B2 | | 9/2009 | Aviles |
| 7,828,097 | B2 | * | 11/2010 | Kondou ................ E02F 9/0833 |
| | | | | 180/68.1 |
| 7,849,951 | B2 | * | 12/2010 | Borchers ............. B66F 9/07586 |
| | | | | 180/305 |
| 7,874,392 | B2 | * | 1/2011 | Nobayashi ............ E02F 9/16 |
| | | | | 180/89.17 |
| 8,083,019 | B2 | | 12/2011 | Fujita et al. |
| D662,870 | S | * | 7/2012 | Russ ..................... D12/404 |
| 8,262,149 | B1 | | 9/2012 | Russ |
| 8,360,833 | B2 | | 1/2013 | Grantham |
| 8,398,145 | B2 | | 3/2013 | Russ |
| 8,720,971 | B2 | | 5/2014 | Russ |
| 9,101,222 | B2 | | 8/2015 | Minkoff et al. |
| 9,821,637 | B1 | * | 11/2017 | Robles .................. B60H 1/242 |
| 10,752,080 | B1 | * | 8/2020 | Kroyer ................. F04D 29/563 |
| 2003/0070328 | A1 | * | 4/2003 | Spommer ............ E02F 9/0808 |
| | | | | 37/304 |
| 2003/0070861 | A1 | | 4/2003 | Dahl et al. |
| 2003/0073400 | A1 | | 4/2003 | Dahl et al. |
| 2004/0221882 | A1 | * | 11/2004 | Watson ................. A45B 3/00 |
| | | | | 135/16 |
| 2005/0164627 | A1 | | 7/2005 | Boone, Jr. |
| 2005/0210717 | A1 | * | 9/2005 | Ueda ..................... E02F 9/163 |
| | | | | 37/443 |
| 2007/0293136 | A1 | * | 12/2007 | Hancock ............. B60H 1/00407 |
| | | | | 454/143 |
| 2008/0169013 | A1 | | 7/2008 | Brookel et al. |
| 2009/0242311 | A1 | | 10/2009 | Fujita et al. |
| 2014/0097652 | A1 | * | 4/2014 | Minkoff ................ A47C 7/744 |
| | | | | 297/180.14 |
| 2019/0241041 | A1 | * | 8/2019 | Russ .................. B60H 1/00471 |

* cited by examiner

FAN AND CANOPY ASSEMBLY FOR RIDING VEHICLE

CROSS-REFERENCE TO RELATED APPLICATION

This application is a continuation of U.S. patent application Ser. No. 15/811,782, filed Nov. 14, 2017 (now allowed); which claims priority of U.S. patent application Ser. No. 14/225,890, filed Mar. 26, 2014 (issued Dec. 19, 2017, as U.S. Pat. No. 9,844,998); which claims priority of U.S. patent application Ser. No. 13/768,580, filed Feb. 15, 2013 (issued May 13, 2014, as U.S. Pat. No. 8,720,971); which claims priority of U.S. patent application Ser. No. 13/585,307, filed on Aug. 14, 2012 (issued on Mar. 19, 2013, as U.S. Pat. No. 8,398,145); which claims the priority of U.S. patent application Ser. No. 12/548,402 filed on Aug. 26, 2009 (issued on Sep. 11, 2012, as U.S. Pat. No. 8,262,149); which claims the priority under 35 U.S.C. § 119 to U.S. Provisional Application No. 61/091,812 filed on Aug. 26, 2008, and the entire disclosure of which is hereby incorporated by reference in its entirety.

FIELD OF THE INVENTION

The present invention relates to accessory equipment for riding vehicles and, in particular, to a fan and canopy assembly for a riding vehicle.

BACKGROUND

In my prior patent, U.S. Pat. No. 6,202,394 entitled "Downdraft Fan System for Riding Lawnmower" issued Mar. 20, 2001, there is disclosed a downdraft fan system for riding vehicles, such as lawn/farm equipment, that provides a constant flow of ambient air downwardly over the operator to provide protection from heat exposure, dust, and biting insects. The system has been well accepted and has provided improved working conditions for the operator under adverse environmental conditions. I have determined, however, that under severe solar and precipitation conditions additional protection for the operator would be desirable. While numerous canopies are available for open air vehicles of many types, they are not compatible with the ease of installation and operation of my fan system. These canopies would overlie the fan and interfere with its operation by restricting flow air thereto. Further, the position of the fan beneath the canopy draws air from ground level resulting in an undesirable presence of dust, insects and contaminants in the circulating stream. Moreover, their independent mounting would require additional mounting hardware adding expense and introducing support structure interfering with operator vision and freedom of movement.

SUMMARY

The present invention provides a canopy and fan system for riding vehicles wherein a canopy is directly mounted on the fan, without the need for additional mounting hardware. The canopy includes an inner opening circumscribed by an inner flange that overlies the perimeter of the fan assembly without limiting air flow to the fan blades. The flange is attached to existing fan structure thereby providing convenient retrofit or new installation. The opening may be covered by a roof cap that allows free air intake while shielding against sun and precipitation. This new fan and canopy system has been found to result in substantially cooler operating conditions even under extreme solar and moisture conditions.

In one aspect, the present invention provides A fan and canopy assembly for a riding vehicle, said vehicle having a generally vertically extending U-shaped roll bar assembly including a horizontal transverse upper arm located behind an operator seat for the vehicle including a generally rectangular tubular frame member connected at a rear end to said upper arm or said roll bar assembly and extending forwardly and horizontally therefrom, said frame circumscribing a frame opening above said operator seat; downdraft fan connected to said frame member and mounted in said frame opening; a canopy having a center opening circumscribed by an interior peripheral flange engaging said frame member; fastener means connecting said canopy to said frame member, said center opening providing an inlet for said fan and drawing inlet air from above said canopy for direction over said operator seat and said canopy providing protection for said operator from solar and moisture. The fan and canopy assembly may also include an apertured panel in said frame opening and a pair of strap members connected transversely to a bottom surface of said canopy with center sections spanning said openings, wherein said fastener means are connected said center sections of said strap members to said apertured panel.

BRIEF DESCRIPTION OF THE DRAWINGS

The above and other features and advantages of the invention will become apparent upon reading the following description taken in conjunction with the accompanying drawings in which.

DETAILED DESCRIPTION OF THE PREFERRED EMBODIMENTS

Figure 1:
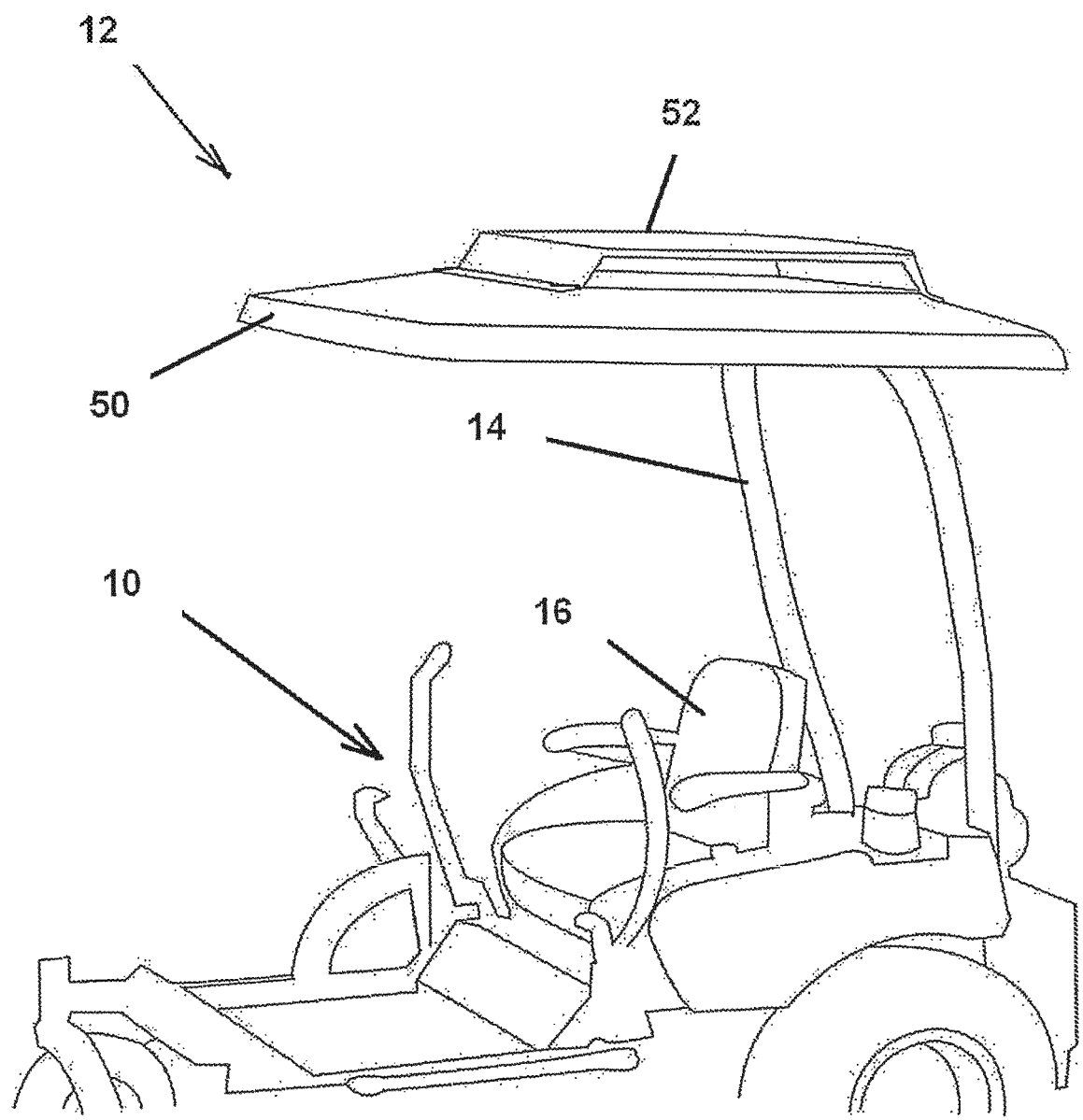
FIG. 1 is a perspective view of a riding vehicle with a canopy and fan assembly in accordance with an embodiment of the invention.
Figure 2:
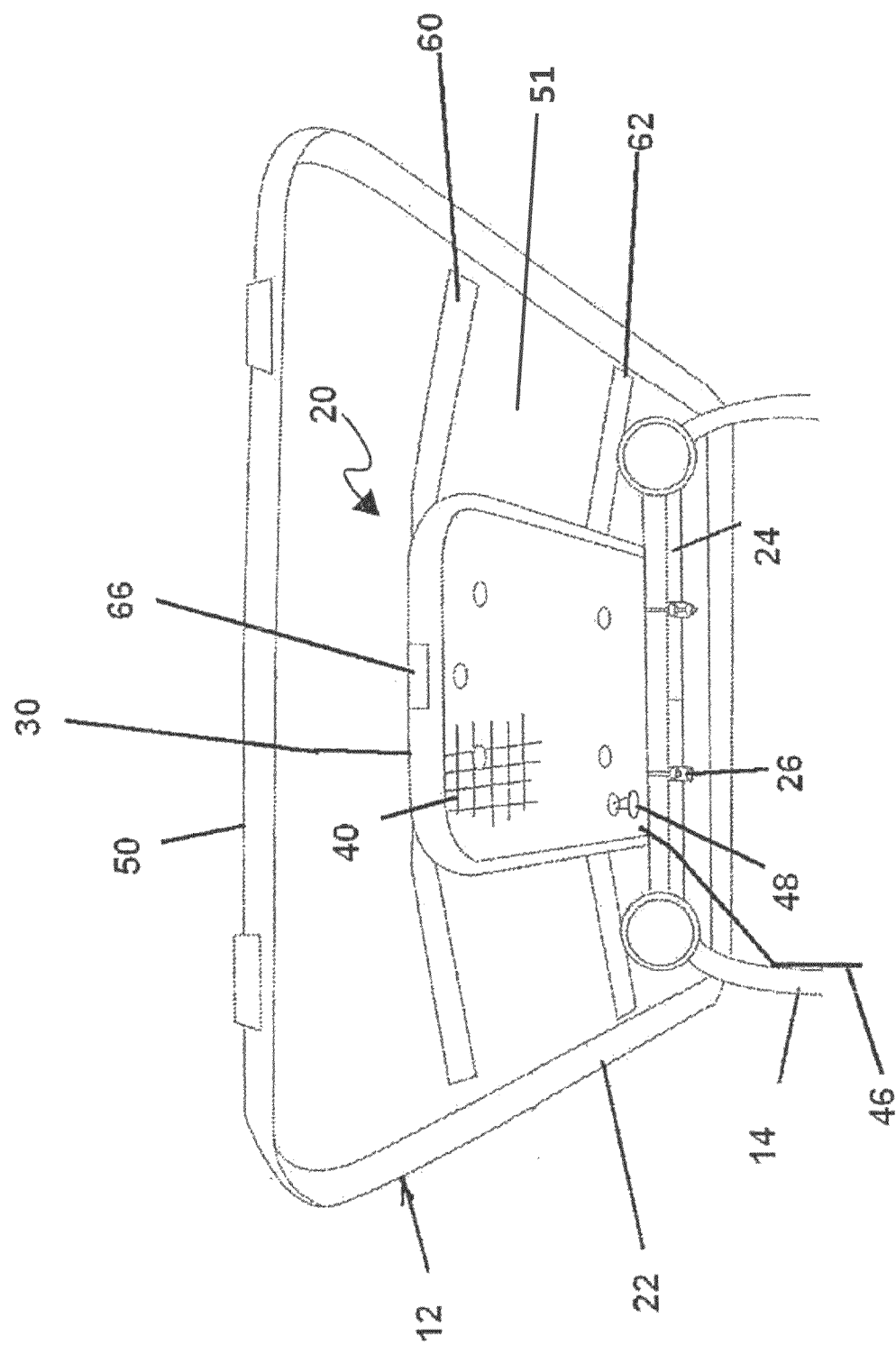
FIG. 2 is a front perspective view of the riding vehicle of FIG. 1 showing the underside of the canopy and fan assembly.

Referring to the drawings, FIGS. 1 and 2 show an open air motorized riding vehicle, such as a lawn mower 10, having a canopy and fan assembly 12. The canopy and fan assembly 12 is supported on a roll bar assembly 14. The canopy and fan assembly 12 extends horizontally from the roll bar assembly 14 forwardly over and above the operator seat 16 and as described below provides solar and precipitation protection for the operator and a downward flow of ambient air to provide protection from heat exposure, dust and biting insects.

Figure 3:
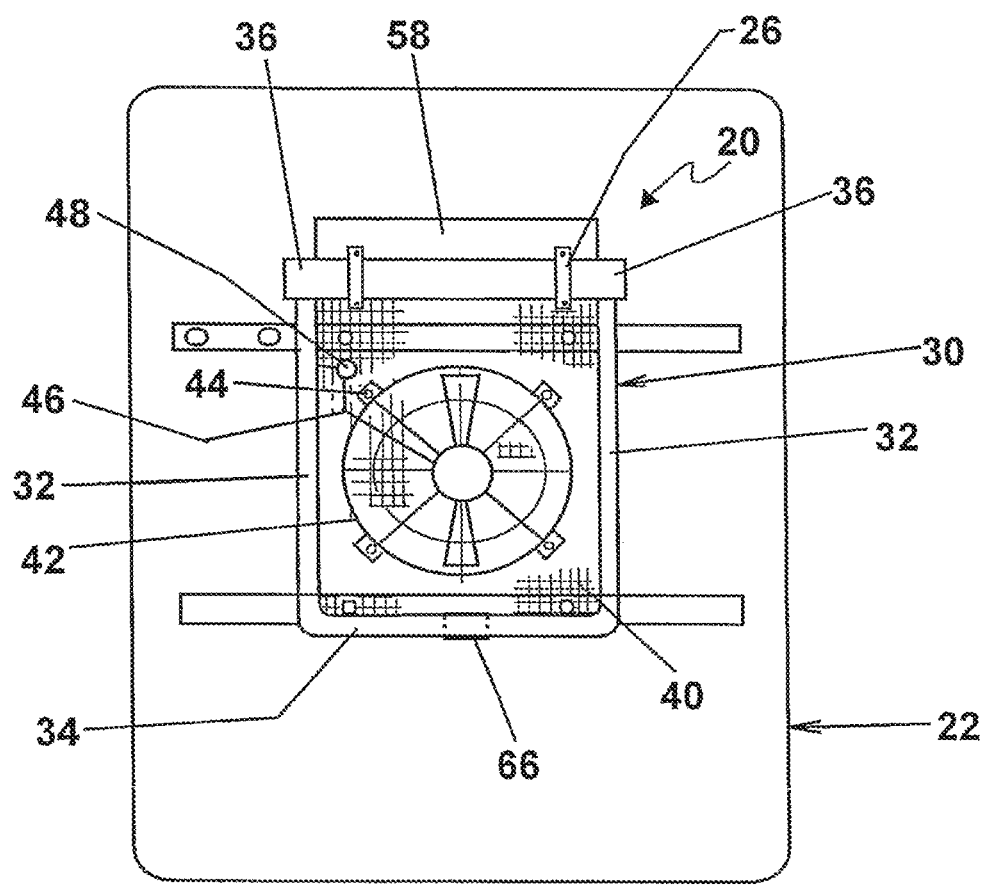
FIG. 3 is a bottom view of the canopy and fan assembly.
Figure 8:
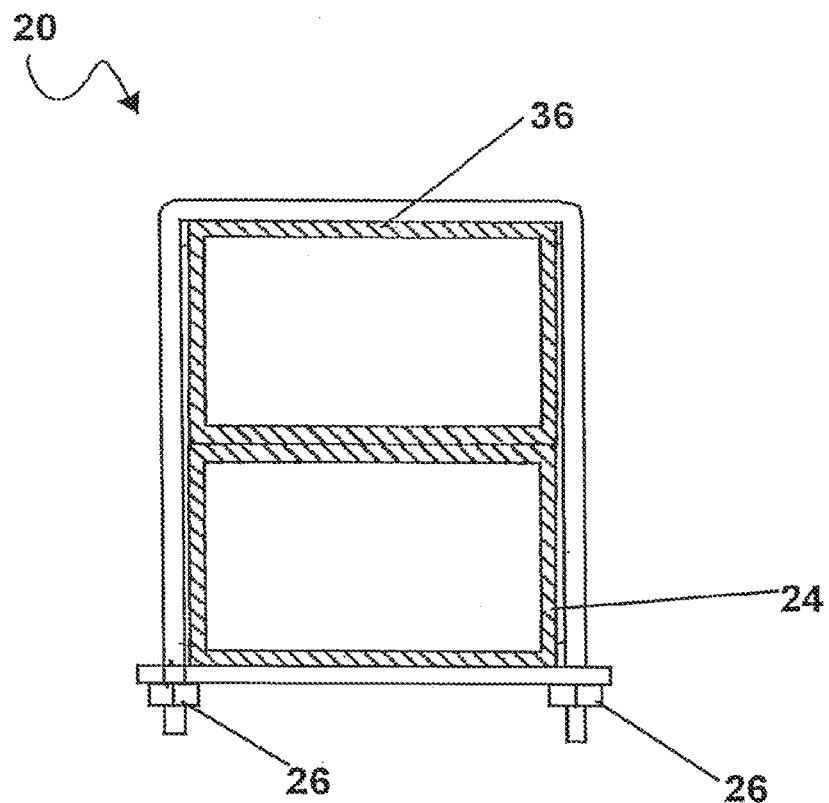
FIG. 8 is view taken along line 8-8 in FIG. 3.

Referring additionally to FIGS. 2 and 3, the canopy and fan assembly 12 comprises a downdraft fan assembly 20 carrying a canopy assembly 22. The fan assembly 20 is supported on the lateral horizontal cross member 24 of the roll bar assembly 14. As additionally shown in FIG. 8, the fan assembly 20 is independently mounted on the cross member by laterally spaced U-bolt assemblies 26. The canopy assembly 22 is solely supported on the fan assembly 20. The fan assembly 20 comprises a generally rectangular peripheral support frame member 30 having laterally spaced side legs 32 and longitudinally spaced front and rear legs 34 and 36 respectively. The rear leg 36 is connected to the cross member 24 by a pair of U-bolt clam assemblies 38. The bottom of the frame member 30 is covered by an apertured grille panel 40, wire mesh, expanded metal or the like. The down draft fan 42 at attached to the panel by fasteners 44 as shown in FIG. 3. The fan 42 is connected to a power cable 46 connected to the power supply of the vehicle and controlled by an operator switch 48 with a control knob 49 mounted at the rear side of the panel 40 within convenient reach of the operator. Construction on the fan assembly is set forth in my prior referenced patent, which is hereby incorporated by reference.

Figure 4:
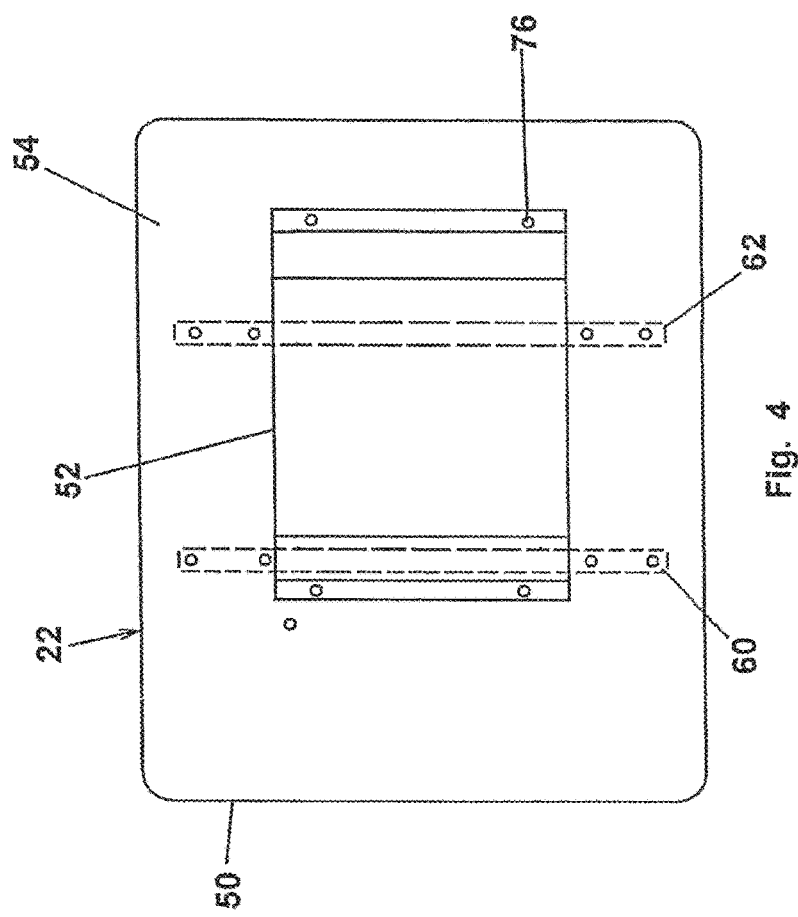
FIG. 4 is a top view of the canopy and fan assembly.
Figure 5:
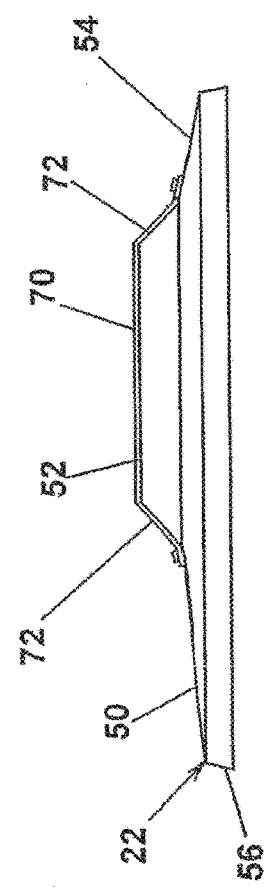
FIG. 5 is a side view of the fan and canopy assembly.
Figure 6:
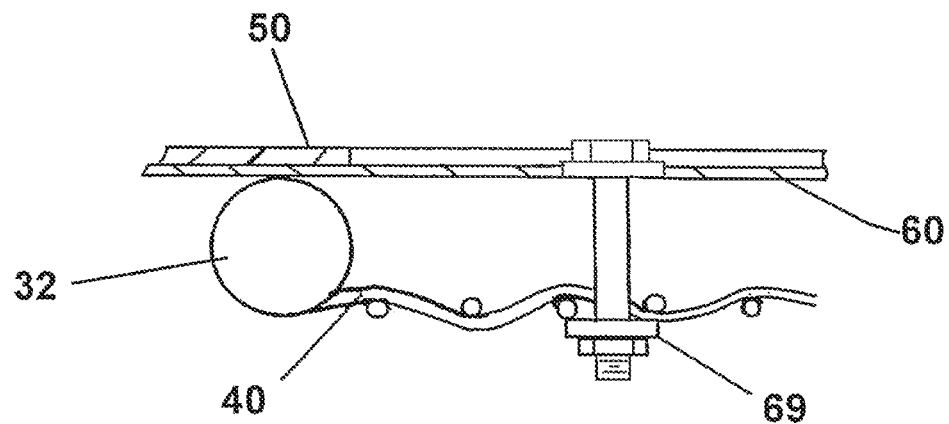
FIG. 6 is an enlarged fragmentary view taken along line 6-6 in FIG. 3.

Referring to FIGS. 4 and 5, the canopy assembly 22 comprises a molded fiberglass shell 50 and a roof cap 52, The shell 50 has a generally rectangular, slightly domed, roof section 54 peripherally terminating with a downwardly extending outwardly flared peripheral rim 56. The roof section 54 includes a rectangular opening 58, centrally laterally positioned and longitudinally positioned toward the rear. The opening 58 is located so as to position the fan directly above the operator seat. The opening 58 is defined by a peripheral flange having front and rear ends respectively and spaced sides. A pair of spaced lateral reinforcing and mounting straps 60, 62 are attached to the bottom surface 51 of the roof section 54 across the opening 58 by suitable fasteners 64. The straps 60, 62 provide structural reinforcement for the shell and mounting sites for attachment of the shell to the fan assembly. The frontal strap 60 includes an arcuate positioning bracket 66 that engages the front cross member of the fan frame member 30 to longitudinally position the canopy assembly thereon in assembly. The straps 60, 62 and the roof section 54 include through holes 68 in the center section. As shown in FIG. 6, the canopy is mounted on the fan assembly and connected at the straps 60, 62 and aperture grille panel 40 by fasteners 69. The roof section 54 of the shell 50 includes a rectangular central opening 56 defined by a peripheral inner flange 58. In assembly, the opening 56 aligned with the opening in the fan assembly 14 and sized such that the flange 58 overlies the frame member 30 of the fan assembly 16 and the outer perimeter of the grille panel, without obstructing air intake flow to the down draft fan 42.

The roof cap 52 includes a rectangular top section 70 having longitudinally spaced downwardly inclined depending legs 72 terminating with outwardly turned flanges 74. In assembly, the top section 70 of the roof cap is slightly larger than the central opening 58 in the shell 50 to provide precipitation and solar protection thereover. The top section 70 is spaced vertically above the roof section 54 to provide side intake ports of sufficient size for the flow capacity of the fan. The flanges 74 of the roof cap 52 are attached to shell by suitable fasteners 76.

Figure 7:
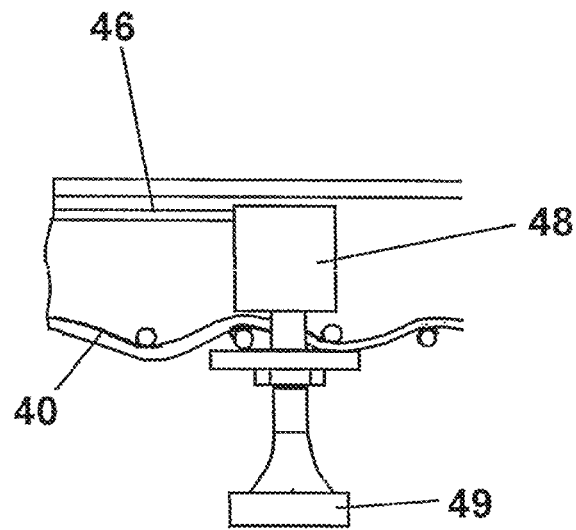
FIG. 7 is a view taken in circle 7-7 of FIG. 3.
Figure 9:
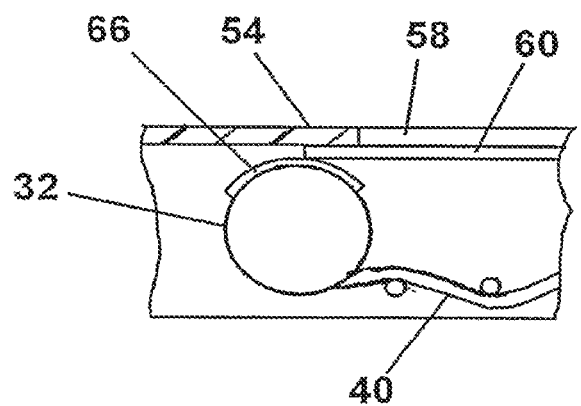
FIG. 9 is a view taken along line 9-9 in FIG. 3.
Figure 10:
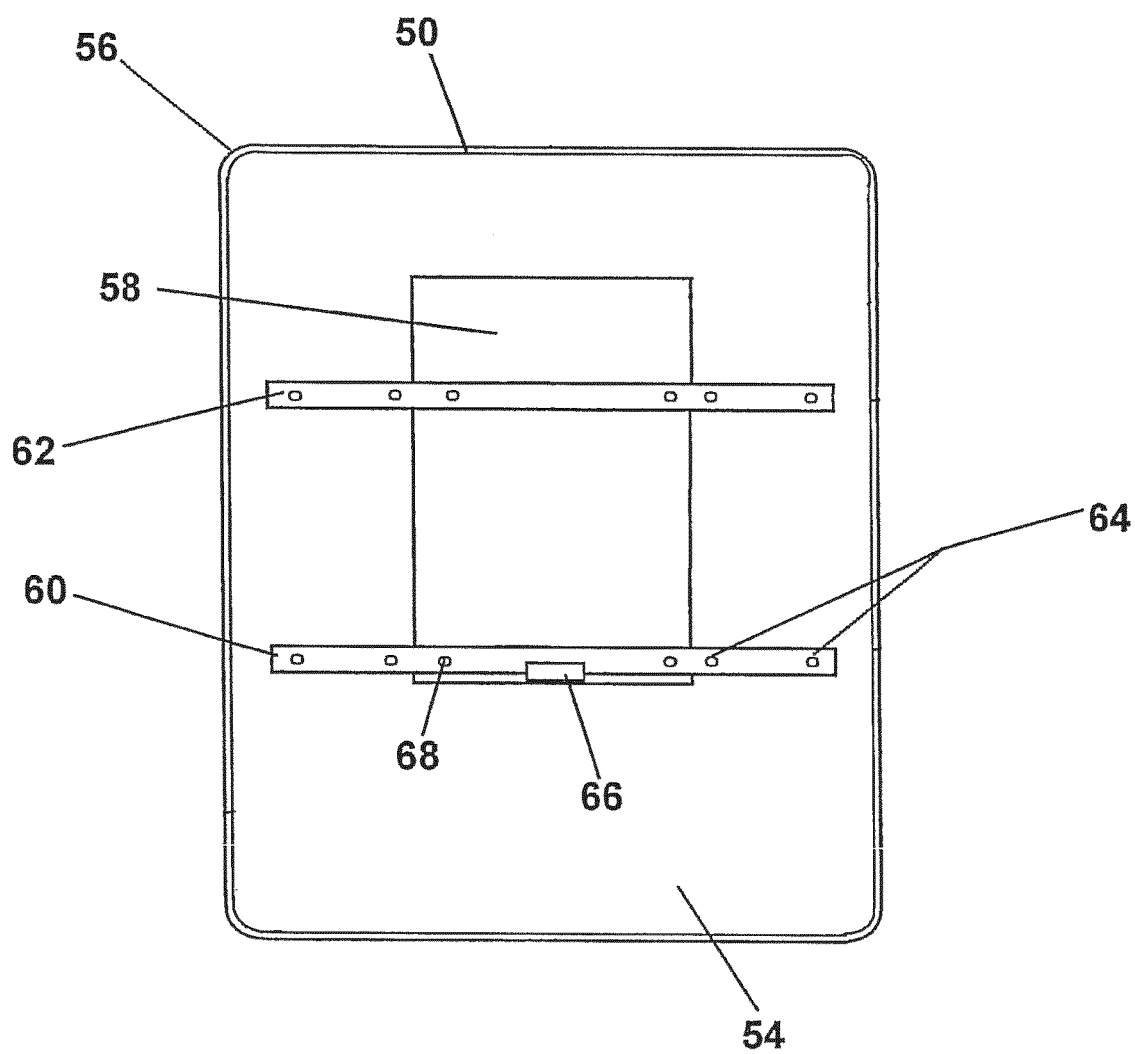
FIG. 10 is a bottom view of the canopy of the fan and canopy assembly.

For assembly, referring to FIG. 7, the rear leg of the fan assembly is mounted on the cross bar of the roll bar by the U bolt assemblies. The canopy assembly 22 is placed over the fan assembly 20 and the opening centered with respect to the fan with the bracket 66 on the strap 60 engaging the front cross member of the frame member 30 of the fan assembly. The canopy assembly 22 is thereafter laterally and longitudinally aligned on the vehicle. Threaded fasteners 64 are inserted through opening in the grille panel 42 and the holes 68 in the straps 60 and the roof section 54 and connected with nuts to secure mounting of the canopy assembly on the fan assembly. As shown in FIG. 9, the operator switch is mounted on the screen above the driver seat and connected between the fan motor and the vehicle power supply.

It will thus be appreciated that the canopy assembly may be connected with existing fan assemblies for retrofit applications, or furnished as an accessory package on new or existing equipment. The mounting of the assembly accommodates a wide range of commercial vehicles without further or extensive modification. Moreover, if desired, the roof cap may be optional and the lateral orientation of the vents changed to a longitudinal flow through passage.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claim.

What is claimed is:

1. A canopy and fan assembly for a riding vehicle, comprising:
   a canopy assembly, wherein the canopy assembly comprises a shell having a roof section and a peripheral rim; and
   a fan assembly, wherein the fan assembly comprises a frame and a downdraft fan, and wherein the fan assembly is secured to a bottom surface of the shell,
   wherein the canopy and fan assembly is configured to secure above a seat of a riding vehicle.

2. The assembly of claim 1, wherein the canopy and fan assembly is secured to a vehicle roll bar assembly.

3. The assembly of claim 2, wherein the canopy and fan assembly is secured to a horizontal cross member of the vehicle roll bar assembly.

4. The assembly of claim 2, wherein the fan assembly further comprises an apertured grill panel.

5. The assembly of claim 2, wherein the fan assembly of the canopy and fan assembly is secured to the vehicle roll bar assembly.

6. The assembly of claim 1, further comprising a power cable connected to the downdraft fan and controlled by an operator switch.

7. The assembly of claim 1, further comprising a canopy aperture, wherein the canopy aperture is a hole disposed through the shell.

8. The assembly of claim 7, wherein the canopy aperture is aligned over the fan assembly.

9. The assembly of claim 7, further comprising a roof cap disposed over the canopy aperture.

10. The assembly of claim 9, wherein the roof cap is configured to allow air to flow through the canopy aperture to the downdraft fan.

* * * * *